United States Patent
Graessley

(10) Patent No.: US 10,034,167 B1
(45) Date of Patent: Jul. 24, 2018

(54) ACTIVATION OF CRYPTOGRAPHICALLY PAIRED DEVICE

(71) Applicant: Apple Inc., Cupertino, CA (US)

(72) Inventor: Joshua V. Graessley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/253,238

(22) Filed: Aug. 31, 2016

Related U.S. Application Data

(63) Continuation of application No. 12/191,282, filed on Aug. 13, 2008, now abandoned.

(60) Provisional application No. 60/979,035, filed on Oct. 10, 2007.

(51) Int. Cl.
| | | |
|---|---|---|
| *G05B 19/00* | (2006.01) | |
| *H04W 12/04* | (2009.01) | |
| *B60W 50/12* | (2012.01) | |
| *H04L 29/06* | (2006.01) | |
| *H04M 1/725* | (2006.01) | |
| *B60W 50/00* | (2006.01) | |

(52) U.S. Cl.
CPC ............ *H04W 12/04* (2013.01); *B60W 50/12* (2013.01); *B60W 2050/0077* (2013.01); *B60W 2520/10* (2013.01); *B60W 2540/28* (2013.01); *B60W 2720/10* (2013.01); *H04L 63/08* (2013.01); *H04M 1/72577* (2013.01)

(58) Field of Classification Search
CPC ................ H04W 12/04; B60W 50/12; B60W 2050/0077
USPC ......................................................... 340/5.8
See application file for complete search history.

(56) References Cited

U.S. PATENT DOCUMENTS

| | | | |
|---|---|---|---|
| 4,092,643 A | 5/1978 | Stolarczyk et al. | |
| 4,566,102 A | 1/1986 | Hefner | |
| 5,473,305 A | 12/1995 | Hwang | |
| 6,351,536 B1 | 2/2002 | Sasaki et al. | |
| 6,459,967 B1 | 10/2002 | Otto et al. | |
| 6,813,482 B1 | 11/2004 | Nakano et al. | |
| 6,961,541 B2 | 11/2005 | Overy et al. | |
| 7,216,231 B2 | 5/2007 | Gehrmann et al. | |
| 7,346,374 B2 | 3/2008 | Witkowski et al. | |
| 7,386,275 B2 | 6/2008 | Pirzada et al. | |
| 7,545,259 B2 | 6/2009 | Luo et al. | |
| 7,548,748 B2 | 6/2009 | Dunko et al. | |

(Continued)

FOREIGN PATENT DOCUMENTS

| | | |
|---|---|---|
| BE | 1015667 | 7/2005 |
| DE | 10015307 | 10/2001 |

(Continued)

OTHER PUBLICATIONS

U.S. Appl. No. 12/191,282, Advisory Action dated Dec. 24, 2014, 3 pages.

(Continued)

*Primary Examiner* — Kerri McNally
(74) *Attorney, Agent, or Firm* — Kilpatrick Townsend & Stockton LLP

(57) ABSTRACT

An event is detected at a first device. Responsive to the detection, at least some functionality of the first device is deactivated. The presence of a second device, cryptographically paired with the first device, is detected by the first device. Responsive to the detection, at least some functionality of the first device is activated or reactivated.

30 Claims, 3 Drawing Sheets

(56) References Cited

U.S. PATENT DOCUMENTS

| | | | |
|---|---|---|---|
| 7,667,571 B2 | 2/2010 | Mueller et al. | |
| 7,689,169 B2 | 3/2010 | Lee et al. | |
| 7,715,795 B2 | 5/2010 | Pirzada et al. | |
| 7,783,879 B2 | 8/2010 | Krummel et al. | |
| 7,812,826 B2 | 10/2010 | Forstall et al. | |
| 7,822,205 B2 | 10/2010 | Ksontini et al. | |
| 7,970,446 B2 | 6/2011 | Witkowski et al. | |
| 8,160,815 B2 | 4/2012 | Geelen | |
| 8,165,527 B2 | 4/2012 | Sims et al. | |
| 9,066,199 B2 | 6/2015 | Forstall et al. | |
| 2001/0018635 A1 | 8/2001 | Miyasaka et al. | |
| 2003/0220765 A1 | 11/2003 | Overy et al. | |
| 2004/0019800 A1 | 1/2004 | Tatebayashi et al. | |
| 2004/0036596 A1 | 2/2004 | Heffner et al. | |
| 2004/0048622 A1* | 3/2004 | Witkowski | G07C 5/008 455/456.6 |
| 2004/0128509 A1 | 7/2004 | Gehrmann et al. | |
| 2004/0213212 A1 | 10/2004 | Reding et al. | |
| 2005/0005120 A1 | 1/2005 | Kahn et al. | |
| 2005/0086332 A1 | 4/2005 | Nakazawa et al. | |
| 2005/0110746 A1 | 5/2005 | Hou et al. | |
| 2005/0219211 A1 | 10/2005 | Kotzin et al. | |
| 2005/0221858 A1 | 10/2005 | Hoddie et al. | |
| 2005/0261816 A1 | 11/2005 | DiCroce et al. | |
| 2005/0277445 A1* | 12/2005 | Bae | B60R 11/0241 455/569.1 |
| 2006/0012577 A1 | 1/2006 | Kyrola et al. | |
| 2006/0033840 A1 | 2/2006 | Diehl et al. | |
| 2006/0066568 A1 | 3/2006 | Cheah et al. | |
| 2006/0083187 A1 | 4/2006 | Dekel et al. | |
| 2006/0143455 A1 | 6/2006 | Gitzinger et al. | |
| 2006/0148464 A1 | 7/2006 | Dunko et al. | |
| 2006/0153386 A1 | 7/2006 | Ksontini et al. | |
| 2006/0156565 A1 | 7/2006 | Linjama et al. | |
| 2006/0205354 A1 | 9/2006 | Pirzada et al. | |
| 2006/0240811 A1 | 10/2006 | De Luca et al. | |
| 2006/0271290 A1 | 11/2006 | Li et al. | |
| 2007/0013550 A1 | 1/2007 | Xie et al. | |
| 2007/0061019 A1 | 3/2007 | Scharnick et al. | |
| 2007/0067634 A1 | 3/2007 | Siegler et al. | |
| 2007/0140230 A1 | 6/2007 | Beshai et al. | |
| 2007/0146199 A1 | 6/2007 | Huang et al. | |
| 2007/0152984 A1 | 7/2007 | Ording et al. | |
| 2007/0198862 A1 | 8/2007 | Sato et al. | |
| 2007/0238491 A1* | 10/2007 | He | G01C 21/26 455/569.2 |
| 2007/0247435 A1 | 10/2007 | Benko et al. | |
| 2007/0257891 A1 | 11/2007 | Esenther et al. | |
| 2007/0259674 A1 | 11/2007 | Neef et al. | |
| 2007/0290793 A1 | 12/2007 | Tran et al. | |
| 2007/0294438 A1 | 12/2007 | Sato et al. | |
| 2007/0294549 A1 | 12/2007 | Sato et al. | |
| 2007/0300063 A1 | 12/2007 | Adams et al. | |
| 2008/0011827 A1 | 1/2008 | Little et al. | |
| 2008/0021633 A1 | 1/2008 | Naito et al. | |
| 2008/0055116 A1 | 3/2008 | Luo et al. | |
| 2008/0070501 A1 | 3/2008 | Wyld | |
| 2008/0113619 A1 | 5/2008 | Torrance et al. | |
| 2008/0160914 A1 | 7/2008 | McRae et al. | |
| 2008/0165024 A1 | 7/2008 | Gretton et al. | |
| 2008/0168368 A1 | 7/2008 | Louch et al. | |
| 2008/0216001 A1 | 9/2008 | Ording et al. | |
| 2008/0248751 A1 | 10/2008 | Pirzada et al. | |
| 2008/0320587 A1 | 12/2008 | Vauclair et al. | |
| 2009/0058821 A1 | 3/2009 | Chaudhri et al. | |
| 2009/0061837 A1 | 3/2009 | Chaudhri et al. | |
| 2009/0061896 A1 | 3/2009 | Jung et al. | |
| 2009/0077464 A1 | 3/2009 | Goldsmith et al. | |
| 2009/0153296 A1 | 6/2009 | LeGasse et al. | |
| 2010/0289951 A1 | 11/2010 | Ryu et al. | |
| 2011/0043527 A1 | 2/2011 | Ording et al. | |
| 2014/0121890 A1 | 5/2014 | Gercekcij et al. | |

FOREIGN PATENT DOCUMENTS

| | | |
|---|---|---|
| EP | 1852774 | 11/2007 |
| FR | 2773756 | 7/1999 |
| GB | 2386517 | 9/2003 |
| JP | 2009301476 | 12/2009 |
| WO | 0114177 | 3/2001 |

OTHER PUBLICATIONS

U.S. Appl. No. 12/191,282, Final Office Action dated Oct. 7, 2014, 25 pages.

U.S. Appl. No. 12/191,282, Final Office Action dated Oct. 24, 2011, 27 pages.

U.S. Appl. No. 12/191,282, Non-Final Office Action dated Mar. 1, 2016, 14 pages.

U.S. Appl. No. 12/191,282, Non-Final Office Action dated Jun. 15, 2011, 24 pages.

U.S. Appl. No. 12/191,282, Non-Final Office Action dated Jun. 12, 2014, 25 pages.

U.S. Appl. No. 12/191,282, Notice of Allowance dated Oct. 13, 2015, 5 pages.

* cited by examiner

ACTIVATION OF CRYPTOGRAPHICALLY PAIRED DEVICE

RELATED APPLICATIONS

This patent application is a continuation of U.S. application Ser. No. 12/191,282, for "Activation of Cryptographically Paired Device," filed Aug. 13, 2008, which claims priority from U.S. Provisional Patent Application No. 60/979,035, for "Activation of Cryptographically Paired Device," filed Oct. 10, 2007. The disclosures of both applications are incorporated by reference herein in their entirety.

TECHNICAL FIELD

The subject matter of this patent application is generally related to activation or reactivation of electronic devices.

BACKGROUND

Some popular electronic devices installed in vehicles (e.g., a radio, a navigation system) include an anti-theft function where the device is automatically deactivated when the device loses power (e.g., a battery is removed). This function is designed to deter theft since the device cannot be functioned outside the vehicle. For some devices, the user must call an activation service to have the device reactivated. Typically, the user provides a serial number and/or other identifying information to the activation service and the service automatically reactivates the device for the user. In some situations, however, the user may not have the serial number and/or phone service to communicate with the activation service. Other devices allow the user to manually enter a code into the device to reactivate the device. For manually activated devices, the user may not remember the code and therefore cannot reactivate the device until the code can be obtained. Obtaining the code may be difficult or impossible if the user forgot the code and the code was written in a manual stored at a different location (e.g., the user's home).

SUMMARY

An event is detected at a first device. Responsive to the detection, at least some functionality of the first device is deactivated. The presence of a second device, cryptographically paired with the first device, is detected by the first device. Responsive to the detection, at least some functionality of the first device is activated or reactivated.

In some implementations, a vehicle can be activated by a first key (e.g., a master key) or a second key. The first key or master key can provide the user unlimited access to the car or the car's features without further authentication. The second key, however, initiates a process by which the car checks for the presence of a device (e.g., a mobile phone, medial player, text messaging device) that has been previously cryptographically paired with the car before allowing the user access to the car or certain of the car's features. For example, a car owner may desire to allow other drivers to drive their car but only under certain conditions, such as prohibiting the driver from sending instant messages while driving the car. The key can initiate a process where the car checks for the presence of the cryptographically paired device, and ensures that the messaging functionality of the device is disabled before allowing the car to start.

DETAILED DESCRIPTION

System Overview

Figure 1:
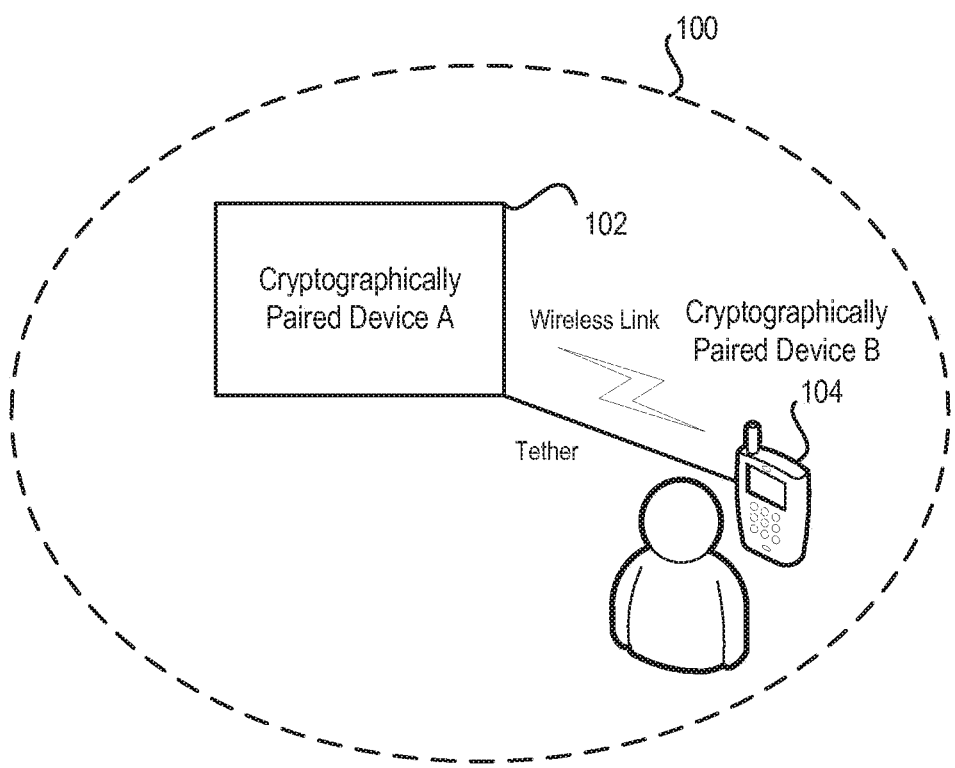
FIG. 1 is a block diagram of an example system for activating or reactivating functionality of a cryptographically paired device.

FIG. 1 is a block diagram of an example system for activating or reactivating functionality of a cryptographically paired device. The system includes cryptographically paired devices 102, 104 that are within transmission range of each other. The transmission range defines a region 100. While the devices 102, 104 are within the region 100, the devices 102, 104 can detect each other's presence. Generally, the devices 102, 104 can be mobile devices, wireless devices, tethered devices, handheld computers, personal digital assistants, cellular telephones, navigation devices, video game consoles, non-GPS head units (e.g., car stereos), digital cameras, laptops, or any other device capable of cryptographically pairing with another device. In the examples that follow, device 102 is a navigation device installed in a vehicle which has been cryptographically paired with a mobile device 104 (e.g., a mobile phone) while operating in region 100 (e.g., inside the vehicle).

Navigation device 102 can include satellite navigation functionality designed to acquire position data to locate a user on a road using previously stored or newly acquired map databases. Navigation device 102 can include circuitry and sensors for supporting a location determining capability, such as that provided by the global positioning system (GPS). In some implementations, navigation device 102 can implement multiple device functionalities in addition to navigation, such as phone, email, and media processing functionalities, for example.

Mobile device 104 can be cryptographically paired with navigation device 102 using known wireless or wired protocol. In one example, navigation device 102 and a mobile device 104 can be wirelessly paired to allow identification, activation, or deactivation of one or more functions on navigation device 102. The initial pairing can be implemented out of band using, for example, Bluetooth pairing technology. In another example, mobile device 104 can be tethered to navigation device 102 using a wired communication link (e.g., Universal Serial Bus (USB)). Mobile device 104 can also be inserted in a dock (not shown) that is tethered or wirelessly connected to navigation device 102. If mobile device 104 has not been previously paired or configured to function with navigation device 102, a cryptographic pairing can be performed to establish the pairing. A cryptographic pairing procedure can include navigation device 102 scanning for mobile device 104 or other devices, such as discovery mode used by Bluetooth-enabled devices.

In some implementations, navigation device 102 can lock out the ability to pair until a previously paired mobile device 104 is again detected. Navigation device 102 can deactivate some or all navigation functionality or other functionality until navigation device 102 detects the presence of the previously paired mobile device 104. For example, if mobile device 104 is authenticated and a cryptographic pairing has previously occurred with navigation device 102, then navigation device 102 can reactivate its deactivated functionality based on redetection of mobile device 104. If the cryptographic pairing fails, navigation device 102 can deactivate one or more of its functions based on the failed pairing. In some implementations, the failed pairing may simply disallow access to navigation device 102 by mobile device 104.

The cryptography technology used to initially pair navigation device 102 and mobile device 104 can, for example, include various encryption techniques, cryptographic functions, protocols, and algorithms that can pair (e.g., bind) one or more devices to one another to ensure data protection and security between the devices. In some implementations, a numeric comparison association technique can be used to cryptographically pair mobile device 104 to navigation device 102. The technique can be used when both navigation device 102 and mobile device 104 are capable of displaying an n-digit number (e.g., 6 or 13 digits) and further, can allow a user to enter a selection, for example. In other implementations, an out of band (OOB) technique can be used to cryptographically pair mobile device 104 to navigation device 102. The technique can be used when an OOB mechanism is used to both discover devices as well as exchange or transfer cryptographic numbers used in the pairing process. In yet other implementations, a "passkey entry" technique can be used to cryptographically pair mobile device 104 to navigation device 102. The passkey technique can be used when navigation device 102 has input capability, but does not have the capability to display n-digits and the mobile device 104 device has output capabilities, for example. Other pairing techniques are also possible. Implementing any or all of the above pairing techniques alone or in combination can provide an advantage to the user by ensuring authenticity of a particular device including user identification and data integrity.

In some implementations, mobile device 104 may become undetectable by navigation device 102 when mobile device 104 is no longer proximate to navigation device 102, such as would occur when mobile device 104 travels outside region 100. In such a scenario, navigation device 102 may be locked or deactivated until mobile device 104 reenters region 100. In this example, region 100 could be the interior of the vehicle. For example, if the user leaves the vehicle holding the mobile device 104 in their hand, navigation device 102 can deactivate usage of any or all its functionality until the mobile device 104 is again available for detection (e.g., within the vehicle). In some implementations, navigation device 102 can lose power or detect unauthorized use and in response deactivate at least some of its own functionality including, but not limited to, pairing functions, communication functions, mobile phone functions, and radio functions. The redetection of mobile device 104 by navigation device 102 can initiate a reactivation of one or more deactivated functions of navigation device 102.

In some implementations, the cryptographic pairing can deter theft or misuse of information or property. For example, the owner of navigation device 102 can specify one or mobile devices for use with navigation device 102. In particular, the navigation device 102 can include configuration menus to allow users to prevent users with unauthorized devices from using or abusing functionality of navigation device 102. Navigation device 102 can be configured to allow the owner of the vehicle to operate the navigation device 102 if the owner is carrying the authorized mobile device 104 on her person. When the authorized mobile device 104 is cryptographically paired with navigation device 102, full functionality may be allowed on navigation device 102. In contrast, if a user who does not have an authorized mobile device 104, one or more functions on navigation device 102 can be locked until an authorized mobile device 104 is detected by the navigation device 102.

In some implementations, cryptographic pairing can be used to define users and/or user limits for using navigation device 102. Navigation device 102 can be configured to wirelessly activate or deactivate one or more functions when mobile device 104 is present. For example, a driver owning mobile device 104 can have restrictions on using navigation device 102. For example, if the driver exceeds a preset speed limit, or drives the vehicle out of an approved location, navigation device 102 may lock down a stereo system, phone function, or other function until the driver lowers the speed or returns to an approved location. The mobile device 104 could also cause a speed limiter in the vehicle to trigger, thus preventing the vehicle from exceeding a certain speed, instead of, or in addition to, disabling some functionality until the speed is reduced.

In some implementations, several devices (e.g., mobile phones, head-sets, etc.) can be configured to pair with navigation device 102. If several devices are proximate to navigation device 102, one device can be selected as an "always link to" device. For example, an owner of navigation device 102 can configure navigation device 102 to accept one mobile device over others mobile devices when several viable linking mobile devices are detected.

In some implementations, cryptographic pairing can be performed automatically using a tethered protocol such as USB. For example, a user can access a menu on mobile device 104 to place mobile device 104 in a tethered pairing mode. Similarly, the user can access a menu on navigation device 102 to enable searching for a particular mobile device 104. At some point, navigation device 102 can search for mobile device 104. The cryptographic pairing can occur upon detecting the presence of mobile device 104 over the USB cable.

In some implementations, a degree of privacy can be achieved by enabling navigation device 102 usage based on a cryptographic pairing. For example, encrypted pairing information (e.g., previous pairing information or passkey information) can be used to authenticate mobile device 104 for purposes of gaining access to the navigation device 102.

Example Process

Figure 2:
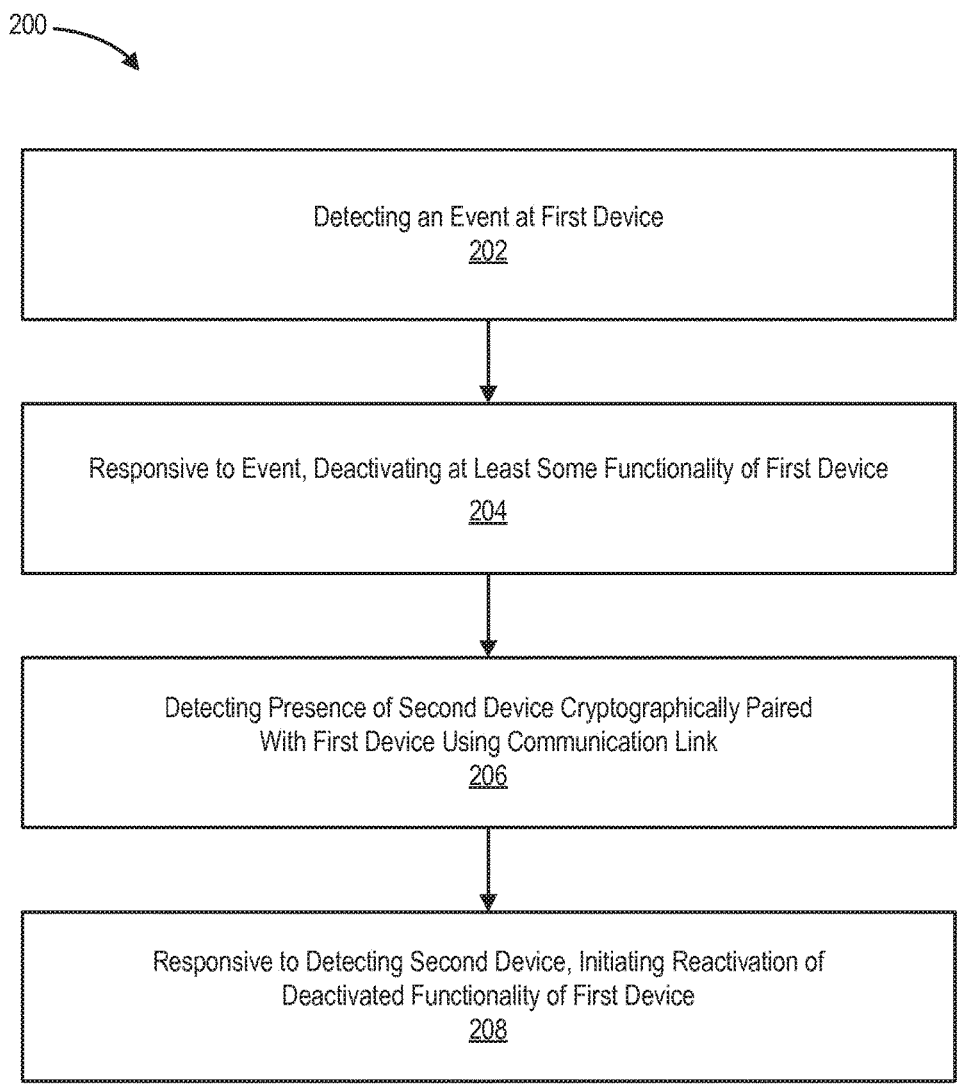
FIG. 2 is a flow diagram of an example process for activating or reactivating functionality of a cryptographically paired device.

FIG. 2 is a flow diagram of an example process 200 for activating or reactivating functionality of a cryptographically paired device. While the reactivating process 200 described below includes a number of operations that appear to occur in a specific order, it should be apparent that the process 200 can include more or fewer operations, which can be executed serially or in parallel (e.g., using parallel processors or a multi-threading environment).

In some implementations, the process 200 includes detecting an event at a first device (202). For example, the event can be detected by the device 102. The event can include a power loss (e.g., battery removal or drainage) of the first device, a lock down, active or passive eavesdrop (e.g., an attack by an external device, hacker, etc.), or another event causing the first device to suspect unauthorized access or loss of power.

In response to one or more events, the first device can deactivate at least some of its functionality (204). For example, if the first device is a navigation device or multimedia system, then the first device can deactivate some or all of its navigation functions, mobile phone functions, communication functions, and radio functions on navigation device 102. The deactivation can include locking some or all functionality on the first device from any or all users, based on the power loss or a detected security breach, for example. In some implementations, the deactivation can include locking out other features, such as communication protocols. For example, if an unauthorized access is detected, the first device can disable its communication ports (wired or wireless) until a user code is entered, or an authorized pairing occurs (e.g., approved cryptographic pairing with a second device). In particular, a pairing with an authorized second device may be requested by the first device to reactivate some or all functionality, for example.

In the event some functionality of the first device is deactivated, the first device (e.g., device 102), or another paired device, can perform a search for, or detect the presence of, a second device (e.g., device 104) cryptographically paired with the first device (e.g., device 102) using a wired or wireless communication link (206). With a wireless communication link, the first device (e.g., navigation system 102) can wirelessly search for a previously paired Bluetooth enabled second device (e.g., mobile device 104). For example, the search may be performed upon replacing a vehicle battery or reattaching a wired vehicle navigation system.

In response to detecting the second device, the first device can initiate activation or reactivation of one or more of its features or functions (208). For example, if the first device is a navigation or multimedia system, then upon detecting a second device (e.g., mobile phone or smart phone), the navigation or multimedia system can unlock, activate or reactivate all or a portion of its functionality. The unlocking, activation or reactivation can be based on the identifying second device, as a previously paired or authenticated device.

In some implementations, in response to detecting the second device, the first device can initiate a locking or deactivation of one or more of its features or functions. In this case, the second device acts as wireless key or remote control for locking out the first device or its functionality. For example, when the user leaves a vehicle, the second device (e.g., a mobile device) can automatically shutdown down the first device (e.g., a navigation or multimedia system, stereo system, hands free telephone) as a security precaution, regardless of whether there was a power loss, security breach or other triggering event.

Paired Device Architecture

Figure 3:
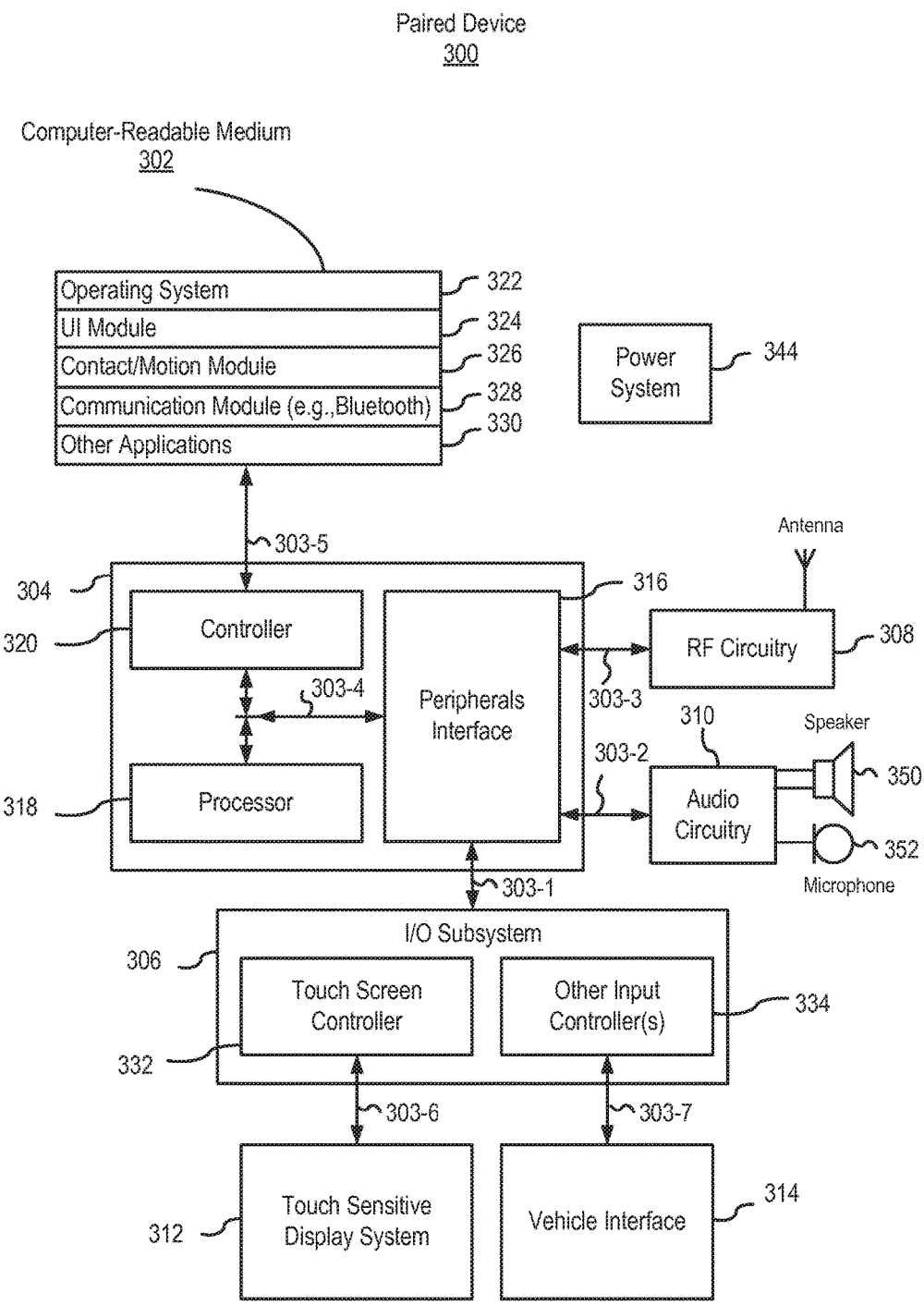
FIG. 3 is a block diagram of a cryptographically paired device architecture for implementing the features described in reference to FIGS. 1-2.

FIG. 3 is a block diagram of an example system architecture for a cryptographically paired device (e.g., devices 102, 104 of FIG. 1) for implementing the features described in reference to FIGS. 1 and 2. A paired device 300 generally includes one or more computer-readable mediums 302, a processing system 304, an Input/Output (I/O) subsystem 306, radio frequency (RF) circuitry 308, and audio circuitry 310. These components may be coupled by one or more communication buses or signal lines 303. The paired device 300 can be any portable electronic device, including but not limited to, an earpiece, a handheld computer, a tablet computer, a mobile phone, a media player, a personal digital assistant (PDA) and the like, including a combination of two or more of these items.

It should be apparent that the architecture shown in FIG. 3 is only one example of an architecture for the paired device 300, and that the device 300 could have more or fewer components than shown, or a different configuration of components. The various components shown in FIG. 3 can be implemented in hardware, software, or a combination of both hardware and software, including one or more signal processing and/or application specific integrated circuits.

The RF circuitry 308 (e.g., a wireless transceiver) is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 308 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, voice over Internet Protocol (VoIP), a protocol for email, instant messaging, and/or a short message service (SMS), or any other suitable communication protocol, including communication protocols not yet developed as of the filing date of this document.

The RF circuitry 308 and the audio circuitry 310 are coupled to the processing system 304 via the peripherals interface 316. The interface 316 includes various known components for establishing and maintaining communication between peripherals and the processing system 304. The audio circuitry 310 is coupled to an audio speaker 350 and a microphone 352 and includes known circuitry for providing telephony functions, such as processing voice signals received from interface 316 to enable a user to communicate in real-time with other users, for example. In some embodiments, the audio circuitry 310 includes a headphone jack (not shown). Voice and data information received by the RF circuitry 308 and the audio circuitry 310 (e.g., in speech recognition or voice command applications) is sent to one or more processors 318 via the peripherals interface 316. The one or more processors 318 are configurable to process various data formats for one or more applications programs 330 stored on the medium 302.

Note that the term "data" includes but is not limited to text, graphics, Web pages, JAVA applets, widgets, emails, instant messages, voice, digital images or video, widgets, MP3s, etc., which can be used by one or more applications programs 330 stored on the medium 302 (e.g., Web browser, email, etc.).

The peripherals interface 316 couples the input and output peripherals of the device to the processor 318 and the computer-readable medium 302. The one or more processors 318 communicate with the one or more computer-readable mediums 302 via a controller 320. The computer-readable medium 302 can be any device or medium that can store code and/or data for use by the one or more processors 318. The medium 302 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 302 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 318 run various software components stored in the medium 302 to perform various functions for the device 300. In some embodiments, the software components include an operating system 322, a user interface module (or set of instructions) 324, a contact/motion module (or set of instructions) 326, a communication module (or set of instructions) 328, and one or more applications (or set of instructions) 330. The communication module 328 can be used to implement some of the operations (e.g., Bluetooth™ pairing) as described in reference to FIGS. 1 and 2.

The operating system 322 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The user interface module 324 facilitates and manages user-received input. In some implementations, the user interface module 324 may be designed to receive a user input and translate the input into a particular response. The response can be presented in a display as a sidebar layout, a web page layout, an audio sound, or any other layout that allows for the presentation of user-customizable content.

The communication module 328 facilitates communication with other devices over one or more external ports or via RF circuitry 308 and includes various software components for handling data received from the RF circuitry 308 and/or the external port. The RF circuitry 308 (e.g., Bluetooth) is adapted for coupling directly to other devices or indirectly over a network (e.g., the Internet, wireless LAN, etc.).

The Bluetooth™ circuitry provides for connecting and/or pairing devices, such as device 102 and 104. In some implementations, the circuitry can provide a way to connect and exchange information between devices such as mobile phones, laptops, PCs, navigation systems, printers, digital cameras, and video game consoles over a secure, short-range radio frequency.

The one or more applications 330 can include any applications installed on the device 300, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

The contact/motion module 326 includes various software components for performing various tasks associated with the touch-sensitive display system 312, as previously described with respect to the embodiments in FIGS. 1-3.

The I/O subsystem 306 is coupled to the touch-sensitive display system 312 and a vehicle interface 314 for controlling or performing various functions, such as power control, speaker volume control, ring tone loudness, keyboard input, scrolling, hold, menu, screen lock, clearing and ending communications and the like. The touch-sensitive display 312 communicates with the processing system 304 via the touch sensitive screen controller 332, which includes various components for processing user input (e.g., scanning hardware). The one or more other input controllers 334 receives/sends electrical signals from/to the vehicle interface 314. The vehicle interface 314 may include physical buttons (e.g., push buttons, rocker buttons, etc.), dials, slider switches, sticks, and so forth.

The touch-sensitive display 312 displays visual output to the user in a GUI. The visual output may include text, graphics, video, and any combination thereof. Some or all of the visual output may correspond to user-interface objects. The touch-sensitive display 312 may also accept input from the user based on haptic and/or tactile contact. The touch-sensitive display 312 forms a touch-sensitive surface that accepts user input, including multiple touches and finger gestures (e.g., a multi-touch-sensitive surface). The touch-sensitive display 312 and the touch screen controller 332 (along with any associated modules and/or sets of instructions in the medium 302) detects contact (and any movement or release of the contact) and finger gestures on the touch-sensitive display 312 and converts the detected contact or gestures into interaction with user-interface objects, such as one or more soft keys, that are displayed on the touch screen when the contact occurs. In an exemplary embodiment, a point of contact between the touch-sensitive display 312 and the user corresponds to one or more digits of the user. The touch-sensitive display 312 may use LCD (liquid crystal display) technology, or LPD (light emitting polymer display) technology, although other display technologies may be used in other embodiments. The touch-sensitive display 312 and touch screen controller 332 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch-sensitive display 312.

The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch-sensitive display 312 may have a resolution in excess of 100 dpi. In an exemplary embodiment, the touch-sensitive display 312 may have a resolution of approximately 168 dpi. The user may make contact with the touch-sensitive display 312 using any suitable object or appendage, such as a stylus, pen, finger, and so forth.

In some embodiments, in addition to the touch screen, the device 300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch-sensitive display 312 or an extension of the touch-sensitive surface formed by the touch-sensitive display 312.

The device 300 also includes a power system 344 for powering the various hardware components. The power system 344 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 316, the one or more processors 318, and the memory controller 320 may be implemented on a single chip, such as the processing system 304. In some other embodiments, they may be implemented on separate chips.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    detecting, at a first subsystem of a vehicle, a presence of a mobile computing device proximate to the first subsystem;
    determining, by the first subsystem of the vehicle, whether the mobile computing device has previously established a cryptographic pairing with the first subsystem of the vehicle; and
    in response to determining that the mobile computing device has previously established a cryptographic pairing with the first subsystem of the vehicle:
    determining, by the first subsystem of the vehicle, an identity of a user associated with the mobile computing device;
    in response to determining that the identity of the user corresponds to a first identity, setting, by the first subsystem of the vehicle, the functionality of the second subsystem of the vehicle to a first state;
    in response to determining that the identity of the user corresponds to a second identity, setting, by the first subsystem of the vehicle, the functionality of the second subsystem of the vehicle to a second state; and
    in response to determining that the mobile computing device has not previously established a cryptographic pairing with the first subsystem of the vehicle, setting, by the first subsystem of the vehicle, a functionality of a second subsystem of the vehicle to a third state.

2. The method of claim 1 wherein in the first state, a first operation is enabled that is disabled in the second state.

3. The method of claim 1 wherein the functionality of the second subsystem includes a speed limiter for the vehicle.

4. The method of claim 1 wherein the functionality of the second subsystem includes a process wherein the vehicle ensures that a messaging functionality of the mobile computing device is disabled before allowing the vehicle to be driven.

5. The method of claim 1 wherein the functionality of the second subsystem includes detecting when the vehicle is driven out of an approved location and locking down an auxiliary component of the vehicle until the vehicle returns to the approved location.

6. The method of claim 5 wherein the auxiliary component includes one or more of a stereo system component or a telephony component.

7. The method of claim 1 wherein the functionality of the second subsystem includes detecting when a speed of the vehicle exceeds a preset speed and locking down an auxiliary component of the vehicle until the speed is below the preset speed.

8. The method of claim 7 wherein the auxiliary component includes one or more of a stereo system component or a telephony component.

9. The method of claim 1 wherein in the first state, a first operation is enabled that is disabled in the third state and wherein in the second state, a second operation is disabled that is enabled in the third state.

10. The method of claim 1 wherein the cryptographic pairing comprises a Bluetooth pairing.

11. A first subsystem for a vehicle, the first subsystem comprising:
    a processor; and
    a computer-readable medium coupled to the processor and storing instructions that, when executed by the processor, cause the processor to:
    detect a presence of a mobile computing device proximate to the first subsystem;
    determine whether the mobile computing device has previously established a cryptographic pairing with the first subsystem of the vehicle; and in response to determining that the mobile computing device has previously established a cryptographic pairing with the first subsystem of the vehicle:
  determine an identity of a user associated with the mobile computing device;
  in response to determining that the identity of the user corresponds to a first identity, set a functionality of the second subsystem of the vehicle to a first state;
  in response to determining that the identity of the user corresponds to a second identity, set the functionality of the second subsystem of the vehicle to a second state; and
in response to determining that the mobile computing device has not previously established a cryptographic pairing with the first subsystem of the vehicle, setting, by the first subsystem of the vehicle, a functionality of a second subsystem of the vehicle to a third state.

12. The first subsystem of claim 11 wherein in the first state, a first operation is enabled that is disabled in the second state.

13. The first subsystem of claim 11, wherein the functionality of the second subsystem includes a speed limiter for the vehicle.

14. The first subsystem of claim 11 wherein the functionality of the second subsystem includes a process wherein the vehicle ensures that a messaging functionality of the mobile computing device is disabled before allowing the vehicle to be driven.

15. The first subsystem of claim 11 wherein the functionality of the second subsystem includes detecting when the vehicle is driven out of an approved location and locking down an auxiliary component of the vehicle until the vehicle returns to the approved location.

16. The first subsystem of claim 15 wherein the auxiliary component includes one or more of a stereo system component or a telephony component.

17. The first subsystem of claim 11 wherein the functionality of the second subsystem includes detecting when a speed of the vehicle exceeds a preset speed and locking down an auxiliary component of the vehicle until the speed is below the preset speed.

18. The first subsystem of claim 17 wherein the auxiliary component includes one or more of a stereo system component or a telephony component.

19. The first subsystem of claim 11 wherein in the first state, a first operation is enabled that is disabled in the third state and wherein in the second state, a second operation is disabled that is enabled in the third state.

20. The first subsystem of claim 11 wherein the cryptographic pairing comprises a Bluetooth pairing.

21. A non-transitory computer-readable storage medium having stored therein program instructions that, when executed by a processor in a first subsystem of a vehicle, cause the processor to perform a method comprising:
  detecting a presence of a mobile computing device proximate to the first subsystem;
  determining whether the mobile computing device has previously established a cryptographic pairing with the first subsystem of the vehicle; and
  in response to determining that the mobile computing device has previously established a cryptographic pairing with the first subsystem of the vehicle:
    determining an identity of a user associated with the mobile computing device;
    in response to determining that the identity of the user corresponds to a first identity, setting the functionality of a second subsystem of the vehicle to a first state;
    in response to determining that the identity of the user corresponds to a second identity, setting the functionality of the second subsystem of the vehicle to a second state; and
  in response to determining that the mobile computing device has not previously established a cryptographic pairing with the first subsystem of the vehicle, setting, by the first subsystem of the vehicle, a functionality of a second subsystem of the vehicle to a third state.

22. The non-transitory computer-readable storage medium of claim 21 wherein in the first state, a first operation is enabled that is disabled in the second state.

23. The non-transitory computer-readable storage medium of claim 21 wherein the functionality of the second subsystem includes a speed limiter for the vehicle.

24. The non-transitory computer-readable storage medium of claim 21 wherein the functionality of the second subsystem includes a process wherein the vehicle ensures that a messaging functionality of the mobile computing device is disabled before allowing the vehicle to be driven.

25. The non-transitory computer-readable storage medium of claim 21 wherein the functionality of the second subsystem includes detecting when the vehicle is driven out of an approved location and locking down an auxiliary component of the vehicle until the vehicle returns to the approved location.

26. The non-transitory computer-readable storage medium of claim 25 wherein the auxiliary component includes one or more of a stereo system component or a telephony component.

27. The non-transitory computer-readable storage medium of claim 21 wherein the functionality of the second subsystem includes detecting when a speed of the vehicle exceeds a preset speed and locking down an auxiliary component of the vehicle until the speed is below the preset speed.

28. The non-transitory computer-readable storage medium of claim 27 wherein the auxiliary component includes one or more of a stereo system component or a telephony component.

29. The non-transitory computer-readable storage medium of claim 21 wherein in the first state, a first operation is enabled that is disabled in the third state and wherein in the second state, a second operation is disabled that is enabled in the third state.

30. The non-transitory computer-readable storage medium of claim 21 wherein the cryptographic pairing comprises a Bluetooth pairing.

* * * * *

UNITED STATES PATENT AND TRADEMARK OFFICE
CERTIFICATE OF CORRECTION

PATENT NO. : 10,034,167 B1
APPLICATION NO. : 15/253238
DATED : July 24, 2018
INVENTOR(S) : Joshua V. Graessley Page 1 of 1

It is certified that error appears in the above-identified patent and that said Letters Patent is hereby corrected as shown below:

In the Claims

Claim 1, Line 17 (Column 10, Line 13): delete "of the sec-" and insert --of a sec- --.

Claim 1, Line 27 (Column 10, Line 24): delete "a second subsystem" and insert --the second subsystem--.

Claim 11, Line 18 (Column 11, Line 7): delete "the second subsystem" and insert --a second subsystem--.

Claim 11, Line 28 (Column 11, Line 17): delete "a second subsystem" and insert --the second subsystem--.

Claim 21, Line 26 (Column 12, Line 17): delete "a second subsystem" and insert --the second subsystem--.

Signed and Sealed this
Eleventh Day of September, 2018

Andrei Iancu
*Director of the United States Patent and Trademark Office*